United States Patent
Mertens et al.

(10) Patent No.: US 11,549,230 B2
(45) Date of Patent: Jan. 10, 2023

(54) SEMI-FINISHED PART FOR A FOUNDATION OF A TOWER CONSTRUCTION, SEMI-FINISHED PART FOUNDATION SEGMENT, FOUNDATION, METHOD FOR PRODUCING A SEMI-FINISHED PART AND METHOD FOR PRODUCING A FOUNDATION

(71) Applicant: Wobben Properties GmbH, Aurich (DE)

(72) Inventors: René Mertens, Oranienburg (DE); Albrecht Brenner, Aurich (DE); Bernd Boettcher, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/981,571

(22) PCT Filed: Mar. 18, 2019

(86) PCT No.: PCT/EP2019/056655
§ 371 (c)(1),
(2) Date: Sep. 16, 2020

(87) PCT Pub. No.: WO2019/179914
PCT Pub. Date: Sep. 26, 2019

(65) Prior Publication Data
US 2021/0054590 A1    Feb. 25, 2021

(30) Foreign Application Priority Data

Mar. 23, 2018   (DE) .................... 10 2018 106 998.7

(51) Int. Cl.
*E02D 27/01* (2006.01)
*E02D 27/42* (2006.01)
(Continued)

(52) U.S. Cl.
CPC ....... *E02D 27/425* (2013.01); *E04H 12/2238* (2013.01); *F03D 13/22* (2016.05); *E02D 2250/0023* (2013.01)

(58) Field of Classification Search
CPC ....... E02D 27/425; E02D 27/42; E02D 27/02; E02D 2250/0023; Y02E 10/72; Y02E 10/728; F03D 13/22; E04H 12/2238
See application file for complete search history.

(56) References Cited

U.S. PATENT DOCUMENTS 6,375,384 B1 * 4/2002 Walton ................ E01F 1/00
404/8
7,614,200 B2   11/2009 Wobben
(Continued)

FOREIGN PATENT DOCUMENTS

CN   102947524 A   2/2013
CN   105473792 A   4/2016
(Continued)

*Primary Examiner* — Brian E Glessner
*Assistant Examiner* — Daniel J Kenny
(74) *Attorney, Agent, or Firm* — Seed Intellectual Property Law Group LLP

(57) ABSTRACT

A semi-finished part for a foundation of a tower construction, in particular of a wind turbine tower, comprising at least two semi-finished part foundation segments, which each have an outer delimitation element and a reinforcement, which is connected to the outer delimitation element and comprises struts protruding from the outer delimitation element, wherein: the outer delimitation elements of the semi-finished part foundation segments form an outer edge, which delimits an interior to be later filled curable casting material; and the reinforcements of the semi-finished part foundation segments extend from the outer edge into the interior.

12 Claims, 5 Drawing Sheets

(51) Int. Cl.
*F03D 13/20* (2016.01)
*E04H 12/22* (2006.01)

(56) References Cited

U.S. PATENT DOCUMENTS

| | | | | |
|---|---|---|---|---|
| 8,359,798 | B2 * | 1/2013 | Armbrecht | E02D 27/425 |
| | | | | 52/297 |
| 8,833,004 | B2 * | 9/2014 | Prass | E02D 27/42 |
| | | | | 52/169.1 |
| 8,938,923 | B2 * | 1/2015 | Nyce | E04B 1/4114 |
| | | | | 52/294 |
| 9,243,418 | B2 | 1/2016 | Bögl et al. | |
| 9,670,909 | B2 | 6/2017 | Hölscher | |
| 9,879,441 | B2 * | 1/2018 | Clifton | E02D 27/425 |
| 10,473,085 | B2 | 11/2019 | Spieth et al. | |
| 10,988,909 | B1 * | 4/2021 | Cotrell | F03D 13/22 |
| 2007/0181767 | A1 | 8/2007 | Wobben | |
| 2015/0376859 | A1 | 12/2015 | Phuly | |
| 2016/0230365 | A1 * | 8/2016 | Shi | E02D 27/02 |
| 2016/0273182 | A1 | 9/2016 | Abele | |
| 2017/0183840 | A1 * | 6/2017 | Tozer | E02D 27/425 |
| 2017/0306583 | A1 | 10/2017 | Phuly | |

FOREIGN PATENT DOCUMENTS

| | | |
|---|---|---|
| CN | 106574601 A | 4/2017 |
| DE | 10226996 A1 | 4/2003 |
| DE | 10321647 A1 | 12/2004 |
| DE | 102013216343 A1 | 2/2015 |
| JP | 2017-125359 A | 7/2017 |
| JP | 2017-133248 A | 8/2017 |
| WO | 2015/059008 A1 | 4/2015 |
| WO | 2016/187720 A1 | 12/2016 |

\* cited by examiner

SEMI-FINISHED PART FOR A FOUNDATION OF A TOWER CONSTRUCTION, SEMI-FINISHED PART FOUNDATION SEGMENT, FOUNDATION, METHOD FOR PRODUCING A SEMI-FINISHED PART AND METHOD FOR PRODUCING A FOUNDATION

BACKGROUND

Technical Field

The invention concerns a semi-finished part for a foundation of a tower construction with at least two semi-finished part foundation segments, a semi-finished part foundation segment for a semi-finished part, a foundation with a semi-finished part arranged on a foundation base surface, and the use of a semi-finished part foundation segment for producing a semi-finished part and/or for producing a foundation. In addition, the invention concerns a method for producing a semi-finished part, and a method for producing a foundation.

Description of the Related Art

Foundations constitute a substructure of a construction and are usually configured to bear all loads of the resulting construction and transfer these to the ground. For larger structures, for example bridges or towers, in particular wind turbine towers, which may have heights of over 100 m (meters) and are exposed to high loads in operation, the foundations must meet correspondingly high requirements. A secure transfer of forces and torques acting on the construction can prevent undesirable movements or deformations of the structures placed on the foundation. For this, the foundations are usually designed to be particularly heavy, stiff and resistant to vibrations.

The foundations must also meet high requirements with regard to service life. Usually, foundations are produced locally on a construction site. According to DE 102 26 996, foundations are produced for example by excavating a foundation bed, producing a stable, substantially flat and horizontal granular subbase in the foundation bed, applying a foundation segment of the structure on the granular subbase (wherein at least three height-adjustable supporting rods are distributed over the foundation segment and fixedly arranged by means of a supporting foot provided at a respective end of the supporting rods, so that only the supporting rods are placed at predefined supporting points of the granular subbase), production of a reinforcement on the granular subbase, and casting of the remaining foundation bed with foundation casting material, in particular concrete, up to above the lower edge of the foundation segment. Here, the quality and hence the service life of the foundation also depend on the ambient conditions prevailing during production.

DE 103 21 647 for example discloses a foundation with pre-produced load-bearing and laterally stabilizing elements.

DE 10 2013 216 343 discloses a wind turbine foundation with a plurality of precast concrete foundation segments. The foundation segments have a plurality of first and second jacket tubes which serve to receive tensioning straps for tensioning the foundation segments.

Existing solutions provide a secure transfer of the forces and torques acting on the structure. Production however requires a relatively long time and large numbers of personnel. In addition, in-situ produced foundations often cannot be made accessible again later. In addition, there is usually costly preparation and finishing work, for example for installation and removal and cleaning of formwork for casting the foundations.

The German Patent and Trademark Office has researched the following prior art in the priority application of the present application: US 2015/0376859 A1, WO 2015/059 008 A1, DE 102 26 996 A1, DE 10 2013 216 343 A1, DE 103 21 647 A1.

BRIEF SUMMARY

Provided are techniques which provide a secure transfer of the forces and torques acting on a structure, in particular a wind turbine tower, by means of a foundation which can be produced easily and/or cheaply. Furthermore, provided is a foundation which can be produced quickly. At least an alternative to one of the previously known solutions should be found.

According to a first aspect, provided is a semi-finished part for a foundation of a tower construction, in particular of a wind turbine tower, comprising at least two semi-finished part foundation segments, which each have an outer limiting element and a reinforcement which is connected to the outer limiting element and comprises struts protruding from the outer limiting element, wherein the outer limiting elements of the semi-finished part foundation segments form an outer edge which delimits an interior to be later filled with curable casting compound, and wherein the reinforcements of the semi-finished part foundation segments extend from the outer edge into the interior.

Production of a foundation on a construction site comprises complex and time-intensive work steps, such as for example the performance of reinforcing work. Admittedly, such site activities can in principle be reduced by the use of precast concrete parts and/or precast concrete segments. Because of the necessary size and in particular the associated weight of precast concrete parts and/or precast concrete segments however, these are only practical for the foundations of smaller structures.

A semi-finished part is also provided for production of a foundation which comprises at least two, preferably several semi-finished part foundation segments. The semi-finished part foundation segments each comprise an outer limiting element and a reinforcement connected to the outer limiting element. The semi-finished part foundation segments are here arranged and aligned such that struts of the reinforcement extend preferably unilaterally out of the outer limiting element. The struts here extend from the outer limiting elements into an interior of the semi-finished part. The interior is delimited by the outer limiting elements of the semi-finished part foundation segments which form an outer edge of the semi-finished part. To produce the foundation, the interior of the semi-finished part may be filled with concrete or another casting compound to form a total cross-section.

Such semi-finished parts may combine construction methods using in-situ cast concrete and precast concrete. The outer edge may serve as formwork for delimiting the interior and may be filled with casting compound, in particular preferably with concrete. After curing of the casting material, preferably a monolithic structure of high strength is thus achieved. In particular, after curing, the outer edge need not be detached and/or removed from the foundation but preferably forms part of the monolithic structure.

Such semi-finished parts and in particular the combined construction method are advantageous in that formwork-free construction can be provided with a substantially shorter construction time. In addition, the weight of the semi-finished part is reduced in comparison with precast concrete parts and/or concrete semi-finished parts, so that transport and/or installation costs can be significantly reduced.

By dividing the semi-finished part into at least two, preferably several semi-finished part foundation segments, a weight and/or a size of individual elements to be transported and/or installed may be further reduced so that the transport and/or installation costs can be lowered further. In particular, thus transport of a semi-finished part or the semi-finished part foundation segments, in particular for a foundation of larger structures, becomes possible for the first time.

For this reason, the semi-finished parts are suitable for the foundations of both smaller structures and larger structures, in particular preferably for tower constructions such as for example piers, towers or generally pillar-like structures. In addition, by the design of the semi-finished parts, foundations can be produced which are suitable for receiving a wind turbine tower, preferably with a plurality of tower segments.

A foundation with such semi-finished parts may be produced significantly more cheaply and/or more quickly and/or more easily than with known solutions for producing a foundation. Thus the personnel numbers and/or time required can be reduced, and/or costs can be saved. In addition, with foundations produced in this way, generally tower structures can be produced more cheaply and/or more quickly and/or more easily. In particular, construction site activities for producing the foundation can be significantly reduced.

A further advantage of such semi-finished parts is that the individual semi-finished part foundation segments can be produced in a protected environment under constant conditions. Furthermore, quality control may be carried out in order to ensure a consistently high quality of the semi-finished part foundation segments and hence also of the semi-finished parts and the foundations.

In addition, any ground excavation can be refilled directly at the edge after positioning of the semi-finished part foundation segment or semi-finished part. The accessibility of the foundation can thereby be provided and filling with casting compound simplified. A further advantage of the semi-finished part in particular is a flexible and/or individual design and/or adaptation of individual semi-finished part foundation segments, and hence of the semi-finished part and the foundation.

In the installed state, the semi-finished part foundation segments may be assembled into a semi-finished part. The semi-finished part foundation segments may here be arranged preferably in a ground excavation, such that the outer limiting elements of the semi-finished part foundation segments are oriented preferably substantially vertically. The struts may in particular extend at an angle, preferably substantially orthogonally, to the respective outer limiting element. Preferably, in the installed state, the individual semi-finished part foundation segments together form the semi-finished part, wherein the struts extend radially from the outer edge of the semi-finished part into the interior and preferably run towards each other.

In the installed state, the struts may preferably be oriented substantially horizontally. Preferably, horizontal struts are designated as struts in the present case.

A reinforcement may in particular be a physical strut construction which comprises at least struts extending substantially horizontally in the installed state. In a foundation, the reinforcement serves to reinforce the load-bearing behavior in conjunction with a concrete or another casting material of the foundation. Since concrete or other casting compounds which may be used to construct the foundation often have a low tensile strength and can mainly absorb compressive forces, reinforcement is advantageous in order to be able to absorb any tensile and bending tensile forces. The reinforcement may preferably comprise rods or fibers of materials with high tensile strength, such as for example metal, in particular steel, glass and/or carbon.

Foundations may preferably have a usually annular or round, preferably circular cross-section orthogonally to a vertical axis. Particularly preferably, foundations may be adapted to the geometry of a tower construction, in particular a wind turbine tower. Tower structures may for example usually have an annular cross-section orthogonally to the vertical longitudinal axis. This annular cross-section may be configured as a circular ring or have a polygonal form. The term "annular" therefore in the present case means not only a circular design but also a polygonal and/or angular design with several straight portions. Preferably, the semi-finished part may be designed to be substantially round, preferably circular. The semi-finished part may be annular or polygonal, in particular square and/or rectangular, in cross-section orthogonally to a vertical axis, for example if a polygonal, in particular square and/or rectangular foundation is to be formed. In the present description, partial embodiments are described with reference to an annular geometry. These may however also be applied to other embodiments described above.

In the installed state, the struts of the reinforcement may preferably extend over a significant region of the interior of the semi-finished part. The length of the struts may here preferably be more than ½ the radius of the semi-finished part, ⅔ of the radius of the semi-finished part, ¾ of the radius of the semi-finished part, ⅘ of the radius of the semi-finished part, ⅚ of the radius of the semi-finished part, 6/7 of the radius of the semi-finished part, ⅞ of the radius of the semi-finished part, 8/9 of the radius of the semi-finished part, or 9/10 of the radius of the semi-finished part. Alternatively, the length of the struts may preferably correspond approximately to the radius of the semi-finished part. Furthermore, the length of the struts may preferably be greater than a radius of the semi-finished part. Here preferably, the ends of the struts opposite the outer limiting elements of the semi-finished part foundation segments of the semi-finished parts may overlap. The radius of the semi-finished part may here preferably refer to a cross-section of the interior of the semi-finished part or an inscribed circle of the cross-section of the interior of the semi-finished part or a circumscribed circle of the cross-section of the interior of the semi-finished part.

Preferably, the struts may be straight or curved in arcuate form. The struts may also have straight and/or arcuate portions.

The outer limiting element may preferably serve as a formwork element cast from concrete. Alternatively, the outer limiting element may comprise a casting material. Particularly preferably, the outer limiting element may comprise the same material as a casting compound of the foundation or a material compatible with the material of the casting compound of the foundation. Furthermore, the outer limiting element may preferably be reinforced. In addition, the struts of the reinforcement may be attached, preferably anchored, in the outer limiting element.

Furthermore, the outer limiting element may preferably be designed to be planar. For this, the outer limiting element has an extent in a surface plane in the direction of a height and width of the outer limiting element which is many times greater than an extent in the direction of a thickness of the outer limiting element. The height of the outer limiting element in the installed state extends substantially vertically. The width of the outer limiting element in the installed state extends substantially in the circumferential direction of the outer edge of the semi-finished part. The surface plane and/or the outer limiting element may preferably be straight or curved, in particular preferably convex, or be annular or dish-like.

Preferably, the outer limiting element may have a width which particularly preferably is less than 10.0 m, 8.0 m, 6.0 m, 5.0 m, 4.8 m, 4.5 m, 4.3 m, 4.0 m, 3.8 m, 3.5 m, 3.3 m, 3.0 m, 2.5 m, 2.0 m, 1.5 m or 1.0 m. Particularly preferably, each outer limiting element may have such a width that the outer limiting elements of the semi-finished part foundation segments, when assembled in the installed state, substantially form the outer edge. In particular, the outer limiting element may have a width which is advantageous for the transportability of the semi-finished part foundation segments.

In the installed state, the outer edge is oriented preferably substantially vertically. In addition, the outer edge may preferably form a continuous circle and/or be closed in itself. Alternatively, the outer edge may be closed and, in addition to the outer limiting element of the semi-finished part foundation segments, comprise at least one additional installation element and/or wall element, for example a formwork which is removed again after casting of the foundation. Here preferably, the outer limiting elements and the at least one installation element and/or wall element may preferably also form a continuous outer edge which is closed in itself.

Preferably, a height of the outer edge may substantially limit a height of the semi-finished part and, after casting, a height of the foundation and hence a foundation top surface. Particularly preferably, the foundation surface may lie substantially at a surrounding level and preferably be flat and/or at least not curved. Preferably, the foundation may have at least one raised portion, the top side of which in particular lies above or below the surrounding level, and/or at least one lowered portion, the top side of which lies in particular above or below the surrounding level.

With reference to the arrangement and/or extent directions of the semi-finished part and/or semi-finished part foundation elements, in particular also the height and/or width and/or thickness of the outer limiting elements, the data relate to the installed state of the semi-finished part and/or semi-finished part foundation segments. Preferably, terms such as for example radial, in the circumferential direction, etc., relate to a semi-finished part, in particular a substantially vertical longitudinal axis which may preferably be a central axis and/or a rotational axis of the semi-finished part, and any cross-sectional forms of such a semi-finished part, in particular both circular cross-sections and polygonal cross-sections. Furthermore, preferably terms such as horizontal, vertical, bottom, top, etc. refer to the installed state of the semi-finished part or semi-finished part foundation segment or foundation. Thus usually, a foundation base surface forms a bottom end and/or a foundation top surface forms a top end of a foundation or semi-finished part in the installed state.

A foundation base surface may be a ground surface which is configured to receive the semi-finished part and hence the foundation. For this, the ground surface is preferably treated. For example, a ground may be excavated and/or levelled and/or compacted. Particularly preferably, the foundation base surface may lie substantially below the surrounding level.

The invention is not restricted to use in tower constructions, in particular wind turbine towers, although it may be used here particularly advantageously and economically. Rather, a semi-finished part for a foundation may also be used in constructions of other types, in particular pillar-like structures.

Preferably, the reinforcement is formed in the manner of a grid structure and particularly preferably may comprise vertical struts connected to the struts, wherein preferably the vertical struts are supported on the struts. In the installed state, the vertical struts may have a substantially vertical extent. Preferably, the vertical struts may extend substantially orthogonally to the struts. Preferably, the vertical struts may be straight or curved in arcuate form. Alternatively, the vertical struts may comprise straight and/or arcuate portions. Furthermore, the vertical struts may be formed substantially parallel and/or coaxially to the outer limiting element of a semi-finished part foundation segment.

Alternatively or additionally, the reinforcement may comprise tangential struts connected to the struts. The tangential struts may extend substantially in the circumferential direction. In the installed state, the tangential struts may preferably be configured as substantially radial horizontal struts. Preferably, the tangential struts may be straight or curved in arcuate form. Alternatively, the tangential struts may comprise straight and/or arcuate portions. Furthermore, the tangential struts may be formed substantially parallel and/or coaxially to the outer limiting element.

Preferably, the reinforcement may comprise vertical struts connected to the struts, and tangential struts connected to the struts. In particular, the tangential struts and the vertical struts may be connected to the struts preferably at one point, for example by means of a wire, a clamp or by welding. The tangential struts may preferably be formed orthogonally to the vertical struts. By designing the reinforcement as a grid structure, the force flow of the forces acting on the foundation can be optimized.

Alternatively, preferably, the tangential struts may be connected to the vertical struts, wherein preferably the struts may be connected to the tangential struts or the vertical struts.

In addition, the struts and/or the vertical struts and/or the tangential struts may be configured substantially rod-like. The term "rod-like" preferably means that the struts and/or the vertical struts and/or the tangential struts may be designed to be elongate, preferably cylindrical, polygonal, etc. Accordingly, the struts and/or the vertical struts and/or the tangential struts may preferably have an extent in the longitudinal direction which is greater than an extent in the direction of a height and/or a width.

Preferably, the struts of the reinforcement may be distributed equidistantly or load-dependently over the width of the outer limiting element. Preferably, when distributed load-dependently, the struts may have different mutual spacings, in particular tighter spacings and/or wider spacings. In the installed state, preferably the struts of the semi-finished part foundation segments are distributed equidistantly or load-dependently along an inner periphery of the outer edge. With this design, a force flow may be provided over the entire region of the semi-finished part and hence also of the foundation.

In a particularly preferred variant embodiment of the semi-finished part, it is provided that the semi-finished part foundation segments can be arranged on a foundation base surface so that the outer edge and the foundation base surface delimit the interior. The interior may here be delimited laterally by the outer limiting elements of the semi-finished part foundation segments. The semi-finished part foundation segments are preferably designed to be open at the top in the direction of the foundation top surface and/or open at the bottom in the direction of the foundation base surface. In the installed state, the interior of the semi-finished part may be additionally delimited by the foundation base surface. Preferably, the interior may be designed to be open at the top. With this design, concrete or another casting material for producing the foundation can be cast from above into the interior of the semi-finished part onto the foundation base surface in the direction of gravity.

Particularly preferably, the semi-finished part foundation segments are partly or fully free from a lower base element in the installed state. According to this embodiment, the semi-finished part foundation segments are designed to be open at the bottom in the direction of a foundation base surface. With this design, concrete or another casting material for producing the foundation can be cast into the interior of the semi-finished part onto the foundation base surface. In this way, a foundation can be adapted particularly easily to the conditions and/or the surface of the foundation base surface.

Furthermore preferably, the semi-finished part foundation segments may be partly or completely free from a top cover element in the installed state. Accordingly, the semi-finished part foundation segments are designed to be open at the top in the direction of the foundation top surface. With this design, the interior of the semi-finished part is easily accessible, and concrete or another casting material can be cast from above into the interior in the direction of gravity. In addition, the casting can preferably be smoothed over the entire surface.

According to a further preferred embodiment variant, it is provided that the outer edge is substantially annular. Particularly preferably, the form of the outer edge may be adapted to a form of a wall of a tower structure to be erected on the resulting foundation.

Furthermore, it is preferred that all or groups of the semi-finished part foundation segments are substantially identical. Preferably, the semi-finished part foundation segments may have identical heights and/or an identical height profile from the outer limiting element over the length of the struts. Further preferably, the semi-finished part foundation segments may have outer limiting elements with identical heights and/or identical widths and/or identical thicknesses. Furthermore, the semi-finished part foundation segments may have an identical number of struts which preferably have an identical length. These struts may preferably extend at respective identical angles from the outer limiting element. In addition, the struts may extend identically from the outer limiting element. Preferably, the individual struts are spaced apart from each other by the same distance or load-dependently. Particularly preferably, the semi-finished part foundation segments firstly are designed to be substantially identical, and secondly adapted individually to the expected circumstances, such as for example the forces to be expected. The identical design is particularly advantageous in that the semi-finished part foundation segments can be arranged particularly easily. As a result, a semi-finished part comprising individual semi-finished part foundation segments can be produced easily and quickly, and hence the site activities associated therewith can be reduced.

In addition, it is preferred that the semi-finished part foundation segments are configured substantially as ring segments. Particularly preferably, the ring segments may preferably be circle segments with a capped tip. In cross-section, the ring segments may have an extent in the radial direction which is designed to dissipate forces acting on the structure to be erected. Therefore it is particularly advantageous if this extent in the radial direction is the same as or larger than an extent in the radial direction of a wall of the structure to be erected.

It is furthermore preferred that the semi-finished part foundation segments are configured as circle segments. With this design, the individual semi-finished part foundation segments can easily be arranged and assembled into a semi-finished part. Thus simple and rapid production of the semi-finished part can be provided.

According to a preferred embodiment, the semi-finished part foundation segments are substantially formed as ring segments and/or circle segments.

Preferably, the semi-finished part foundation segments are substantially identical and/or formed mainly as ring segments and/or circle segments.

Particularly preferably, the semi-finished part foundation segments may comprise a support unit which is connected to the struts and arranged substantially coaxially to the outer limiting element. This support unit may preferably be designed to be substantially vertical in the installed state. Preferably, two or more support units may be provided, which preferably may be distributed over a length of the struts. Here, it is particularly preferred if the support elements are spaced apart from each other evenly or load-dependently over the length of the struts. The support elements may preferably be vertical struts or concrete elements which rest on the struts. In addition, the support element may particularly preferably be arranged at an end of the struts opposite the outer limiting element, in order to support the struts in the vertical direction. Such support elements provide a stability of the semi-finished part foundation segments over the length of the struts and/or optimize a force flow. In addition, a stability of the struts may be provided before casting, in particular for transport of the semi-finished part foundation segments.

According to a further preferred variant embodiment, it is provided that an inner limiting element connected to the reinforcement is provided, wherein the inner limiting elements of the semi-finished part foundation segments form an inner edge. The inner edge may preferably be formed to be substantially coaxial, in particular parallel to the outer limiting element. The inner limiting element may preferably constitute a support element at the end of the struts opposite the outer limiting element. The inner edge may preferably be aligned substantially vertically in the installed state. In addition, the inner edge may preferably be closed in itself. Alternatively, the inner edge may, in addition to the inner limiting elements of the semi-finished part foundation segments, comprise at least one additional installation element and/or wall element. Here, preferably, the inner limiting elements and the at least one installation element and/or wall element may preferably form an inner edge closed in itself.

Preferably, the struts extend from the outer limiting element to the inner limiting element. Particularly preferably, the struts extend into the outer limiting element and/or inner limiting element. Here, the struts may preferably be aligned radially and, preferably starting from the outer limiting element, preferably run towards each other in the direction of the inner limiting element.

Preferably, a height of the inner edge may correspond substantially to a height of the outer edge. Alternatively, the height of the inner edge may be less than or greater than a height of the outer edge. Particularly preferably, the height of the foundation and hence of the foundation top surface may be defined by the height of the inner edge and/or the height of the outer edge.

Particularly preferably, a monolithic structure with high strength may be produced, preferably by filling the interior (which is preferably formed as a space between the inner edge and outer edge) with a casting compound, and by curing of the casting compound. Furthermore, preferably a monolithic structure with high strength may be produced, preferably by filling a first partial interior (which is preferably formed as a space between the inner edge and the outer edge) and a second partial interior (which is preferably formed as a space inside the inner limiting element) with a casting compound, and by curing of the casting compound. Furthermore, preferably an additional reinforcement may be arranged inside the second partial interior. In particular, after curing, the inner edge cannot be detached and/or removed. Preferably, the inner edge forms a lost formwork.

The inner limiting element may preferably serve as a cast concrete formwork element. Alternatively, the inner limiting element may comprise a casting compound. Particularly preferably, the inner limiting element may comprise the same material as a casting compound of the foundation or a material compatible with the material of the casting compound of the foundation. Furthermore, the inner limiting element and/or the outer limiting element may preferably be reinforced.

Preferably, the inner limiting element may be designed to be planar. Here, the inner limiting element may have an extent in a plane in the direction of a height of the inner limiting element which is many times greater than an extent in the direction of a thickness of the inner limiting element. The extent in the direction of the thickness of the inner limiting element may preferably be substantially orthogonal to the extent in the direction of the height of the inner limiting element. The plane and/or the inner limiting element may preferably be straight or curved, particularly preferably convex, or be designed to be annular or dish-like.

Preferably, the inner limiting element may have a width which particularly preferably may be greater than ⅙, ⅕, ¼, ⅓, ½, ⅔, ¾ or ⅚ of the width of the outer limiting element. Alternatively, the width of the inner limiting element may correspond to a width of the outer limiting element.

A further preferred refinement of the semi-finished part is distinguished in that portions of reinforcements of adjacent semi-finished part foundation segments overlap. Adjacent semi-finished part foundation segments may mean the semi-finished part foundation segments which are arranged next to each other in the installed state in order to form the semi-finished part. The overlap of reinforcements may provide an even force flow over the entire semi-finished part or entire foundation.

Preferably, the reinforcement of a semi-finished part foundation segment may also comprise a tangential strut extending substantially in the circumferential direction, with a first protruding end and/or a second protruding end, wherein the first protruding end and/or the second protruding end of the tangential struts of one of the at least two semi-finished part foundation segments, and the reinforcement of the adjacent semi-finished part foundation segment, overlap. Preferably, the first protruding end and/or the second protruding end may overlap with the first struts and/or the second struts of the reinforcement of the adjacent semi-finished part foundation segment. Particularly preferably, the second protruding end of a first semi-finished part foundation segment may overlap with a first protruding end of the second semi-finished part foundation segment; similarly, preferably the second protruding end of the second semi-finished part foundation segment may overlap with the first protruding end of a third semi-finished part foundation segment. With this design, a force flow may be evenly distributed over preferably the entire foundation or reinforcement.

A further preferred refinement of the semi-finished part is distinguished in that the reinforcement of at least one semi-finished part foundation segment also comprises introduced reinforcing elements. Particularly preferably, the reinforcement elements may be introduced in the circumferential direction. The reinforcement elements may preferably be additional reinforcing struts and/or reinforcing baskets and/or similar. Here, the reinforcement may preferably be configured so that additional reinforcing elements can be anchored and/or arranged therein. In this way, the reinforcements may be adapted to special and/or local loads, and/or locally acting forces to be expected.

Finally, it is preferred that at least one semi-finished part foundation segment comprises at least one functional element. Preferably, the at least one semi-finished part foundation segment may preferably comprise two or more functional elements, in particular depending on requirements. A functional element may preferably be a jacket tube and/or a line such as for example a pipeline and/or a cable and/or the like, or a connecting element such as for example an anchoring element and/or the like. Such functional elements may preferably be embedded in the foundation after casting of the foundation, and preferably be accessible. In particular, preferably the reinforcement of at least one semi-finished part foundation segment may comprise the at least one functional element.

Preferably, a connecting portion may be integrated in at least one semi-finished part foundation segment. Such connecting portions serve to receive structures, in particular tower structures.

Particularly preferably, the struts of the reinforcement may comprise first struts and second struts which are spaced apart from the first struts in the vertical direction and preferably each extend substantially horizontally from the outer limiting element in the direction of a vertical axis. Here, preferably, the first struts may be arranged in a first horizontal plane, and/or the second struts may be arranged in a second horizontal plane.

The horizontal plane may preferably be designed to be horizontal or slightly sloping relative to the horizontal.

Further preferably, the vertical struts may extend between the first struts and the second struts, and preferably connect the first struts and the second struts. Furthermore, the vertical struts may preferably be supported on the first struts and/or the second struts. In the installed state, the vertical struts may extend substantially in the vertical direction between the first struts and the second struts. Preferably, the vertical struts may be arranged orthogonally to the first and/or second struts. Furthermore, the vertical struts may be arranged substantially parallel to the outer limiting element and/or in some cases parallel to the inner limiting element. Particularly preferably, two or more vertical struts may be arranged in a vertical plane parallel to the outer limiting element.

The vertical plane may preferably be designed to be vertical or slightly sloping relative to the vertical.

Furthermore, the struts may preferably be arranged spaced apart from each other, particularly preferably the first struts may be arranged spaced apart from each other, and/or the second struts may be arranged spaced apart from each other.

Preferably, the first struts may extend in the direction of the longitudinal axis and be oriented radially, and/or the second struts may extend in the direction of the longitudinal axis and be oriented radially.

Preferably, the first struts and/or the second struts may be distributed over a width of the outer limiting element, preferably equidistantly or load-dependently over the width of the outer limiting element, particularly preferably equidistantly or load-dependently in the circumferential direction of the semi-finished part.

Particularly preferably, the outer edge may be configured so as to be substantially annular, wherein the first struts and/or the second struts extend substantially in the radial direction.

Particularly preferably, the first struts may be arranged in a first horizontal plane and the second struts in a second horizontal plane, wherein the first horizontal plane is vertically spaced from the second horizontal plane, and preferably the first horizontal plane extends substantially horizontally and/or parallel to the second horizontal plane.

Preferably, a plurality of struts may be arranged in a plurality of horizontal planes, wherein the plurality of horizontal planes extend parallel to the first horizontal plane and/or parallel to the second horizontal plane.

Furthermore, it is preferred that the vertical struts are arranged spaced apart from each other. In addition, the vertical struts may extend preferably parallel to each other, in particular preferably parallel to the outer limiting element.

Particularly preferably, the vertical struts may be arranged in a first vertical plane and in a second vertical plane, wherein preferably the second vertical plane extends parallel to the first vertical plane. Preferably, the first vertical plane and/or the second vertical plane extend substantially parallel to the outer limiting element and/or where applicable the inner limiting element. The vertical struts may preferably be arranged in a plurality of vertical planes, wherein the plurality of vertical planes preferably extend parallel to the outer limiting element and/or where applicable the inner limiting element.

Preferably, the tangential struts may be connected to the first struts and/or the second struts. Here, the tangential struts may be arranged on the first struts, preferably in the region of a first end of the vertical struts resting on the first struts, and/or on the second struts in the region of the second ends of the vertical struts resting on the second struts. The tangential struts may preferably be arranged in the first horizontal plane and/or the second horizontal plane and/or further horizontal planes.

According to a further aspect, the object cited initially is achieved by a semi-finished part foundation segment for a semi-finished part, comprising an outer limiting element and a reinforcement which is connected to the outer limiting element and comprises struts protruding from the outer limiting element; wherein the outer limiting element is configured so as to form, in the installed state, a part of the outer edge of the semi-finished part which delimits an interior to be later filled with a curable casting compound, wherein the reinforcement extends from the outer edge into the interior.

A preferred refinement of the semi-finished part foundation segment is distinguished in that the semi-finished part foundation segment is fully or partly free from a lower base element in the installed state.

It is furthermore preferred that the semi-finished part foundation segment comprises a support unit which is connected to the struts and arranged substantially coaxially to the outer limiting element.

In addition, the object outlined above is achieved by the aspect of a foundation with a semi-finished part arranged on a foundation base surface, wherein an interior of the semi-finished part is filled with curable casting compound. By filling with the curable casting compound, preferably a total cross-section of the foundation can be completed with the curable casting compound.

Preferably, the foundation may have a tower connecting portion which is configured to receive a tower, preferably a wind turbine tower, and/or a wind turbine. In addition, a tower, in particular a wind turbine tower and preferably a wind turbine, may be received on the foundation.

According to a further aspect, the object cited initially is achieved by the use of a semi-finished part foundation segment to produce a semi-finished part for a foundation of a tower construction, and/or to produce a foundation.

For further advantages, embodiment variants and design details of this further aspect and its possible refinements, reference is made to the description above of the corresponding features and refinements of the semi-finished part.

Particularly preferably, a semi-finished part foundation segment for a semi-finished part of a foundation may be produced with a method comprising the following steps: performance of reinforcing work to produce a reinforcement, provision and/or production of a first edge element, connection of the reinforcement to the first edge element, wherein struts of the reinforcement protrude from the first edge element on at least one side, provision and/or production of a second edge element, arrangement of the first edge element and/or second edge element preferably substantially parallel to each other while maintaining an edge intermediate space, wherein preferably a first end of the struts is situated preferably between the first edge element and the second edge element, filling of the edge intermediate space with curable casting compound and curing of the casting compound.

According to a further aspect, the object cited initially is achieved by a method for producing a semi-finished part, comprising the steps: preparation of a foundation base surface, production and/or provision of at least two semi-finished part foundation segments, and arrangement of the semi-finished part foundation segments on the foundation base surface. Preferably, the step of preparation of a foundation base surface may comprise earth excavation, wherein preferably the foundation may be at least partially lowered below ground level. In addition, preferably this step may comprise levelling and/or compaction of the foundation base surface. The foundation base surface may preferably be formed below a surrounding level.

In addition, the object cited initially is achieved by the aspect of a method for producing a foundation with the steps: production of the semi-finished part, filling of an interior of the semi-finished part with curable casting compound, and curing of the casting compound. Preferably, the curable casting compound may be added to the foundation base surface in the interior of the semi-finished part from a top side of the semi-finished part in the direction of gravity.

The method according to the invention and its possible refinements have features or method steps which make them particularly suitable for use for a semi-finished part according to the invention and its refinements, and for a semi-finished part foundation segment and a foundation. For further advantages, embodiment variants and embodiment details of these further aspects and their possible refinements, reference is also made to the description of the corresponding features and refinements of the other aspects.

BRIEF DESCRIPTION OF THE SEVERAL VIEWS OF THE DRAWINGS

Preferred exemplary embodiments are explained as an example with reference to the attached figures. The drawings show.

DETAILED DESCRIPTION

In the figures, the same parts and those with substantially the same or similar function carry the same reference signs.

Figure 1:
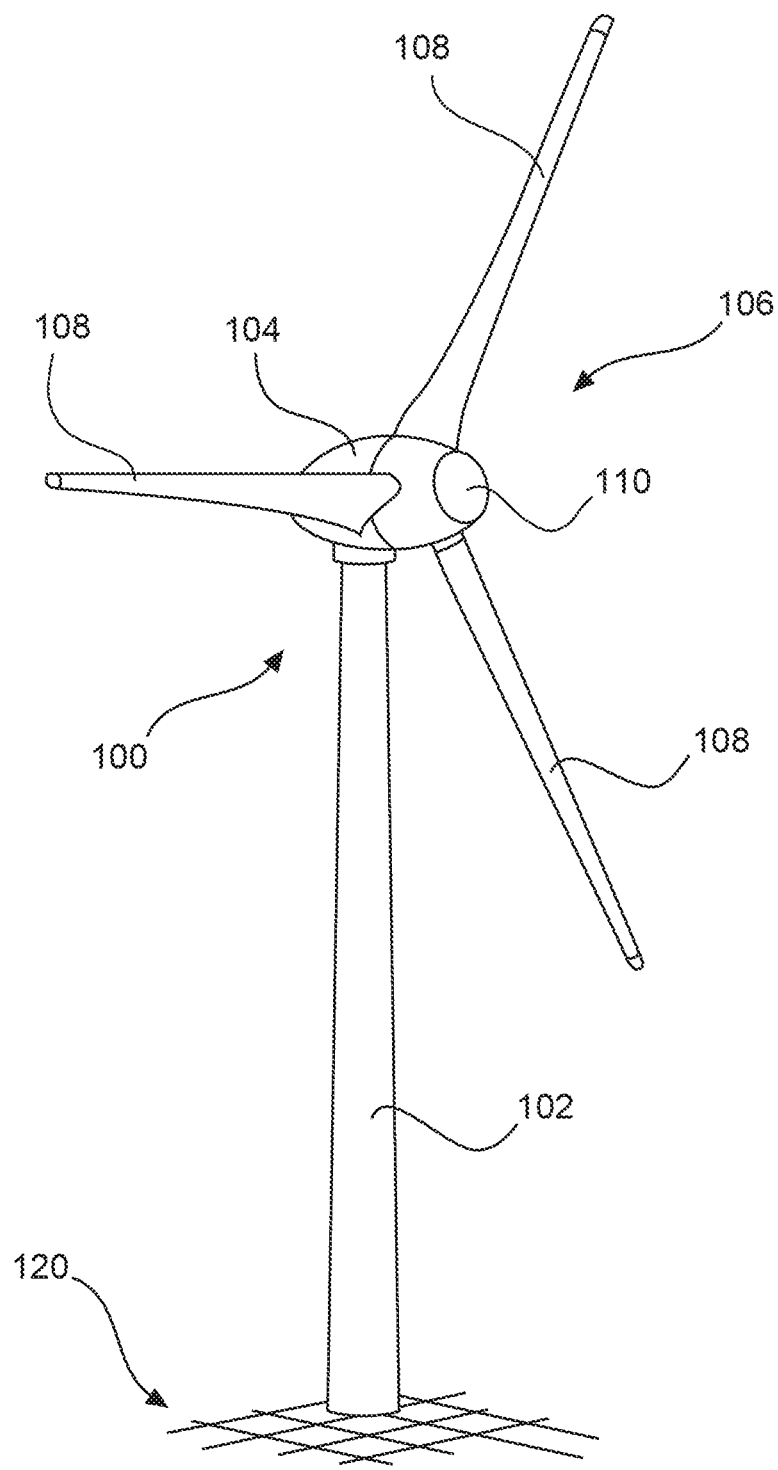
FIG. 1 a three-dimensional view of a wind turbine with a tower and a nacelle.

FIG. 1 shows a diagrammatic, three-dimensional view of a wind turbine according to the invention. The wind turbine 100 has a tower 102 and a nacelle 104 on the tower 102. An aerodynamic rotor 106 with three rotor blades 108 and a spinner 110 is provided on the nacelle 104. The aerodynamic rotor 106 is set in a rotational motion by the wind during operation of the wind turbine, and thus also turns an electrodynamic rotor of a generator which is coupled directly or indirectly to the aerodynamic rotor 106. The electric generator is arranged in the nacelle 104 and generates electrical energy. The pitch angle of the rotor blades 108 may be changed by pitch motors at the rotor blade roots of the respective rotor blades 108. The tower 102 of the wind turbine 100 is arranged on a foundation 120 comprising a semi-finished part as described herein.

Figure 2:
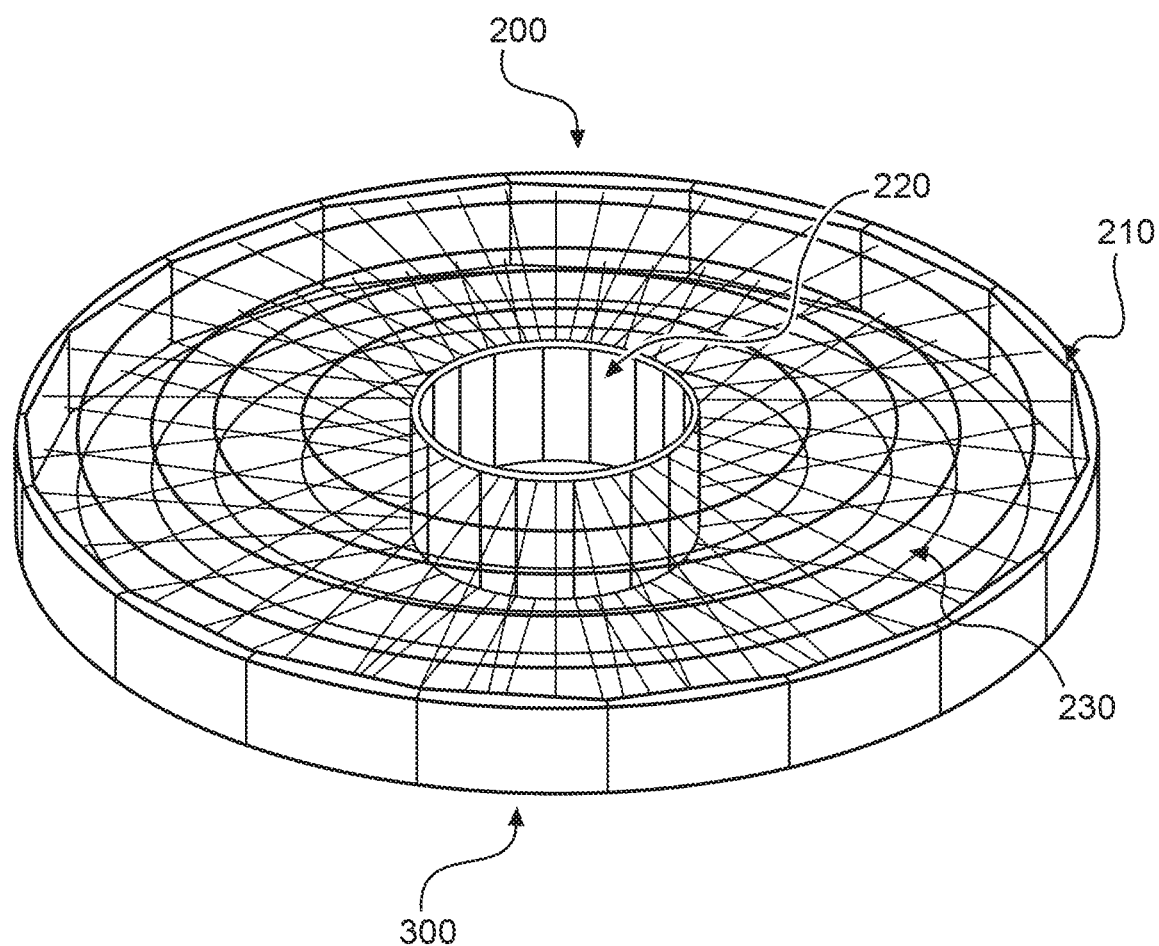
FIG. 2 a perspective view of an exemplary embodiment of a semi-finished part.

FIG. 2 shows a semi-finished part 200 for a foundation in an installed state, which comprises a plurality of substantially identical semi-finished part foundation segments 300. In the example of FIG. 2, the semi-finished part foundation segments 300 are configured as ring segments and each have an outer limiting element 210 and an inner limiting element 220 oriented parallel to the outer limiting element 210. Furthermore, the semi-finished part foundation segments 300 comprise a reinforcement 230 which is formed as a grid construction and comprises struts that are preferably connected together.

In the example shown here, the outer limiting elements 210 are designed to be biconvex and form an outer edge of the semi-finished part 200 extending in the vertical direction. Furthermore, the inner limiting elements 210 are designed to be straight and form an inner edge of the semi-finished part 200. The inner edge is oriented substantially coaxially to the outer edge. The outer edge and the inner edge of the semi-finished part 200 are formed so as to be substantially polygonal. The outer limiting elements 210 and the inner limiting elements 220 are formed so as to be planar. The outer limiting elements 210 and/or the inner limiting elements 220, and the outer edge and/or inner edge, may preferably also be configured differently.

Figure 3:
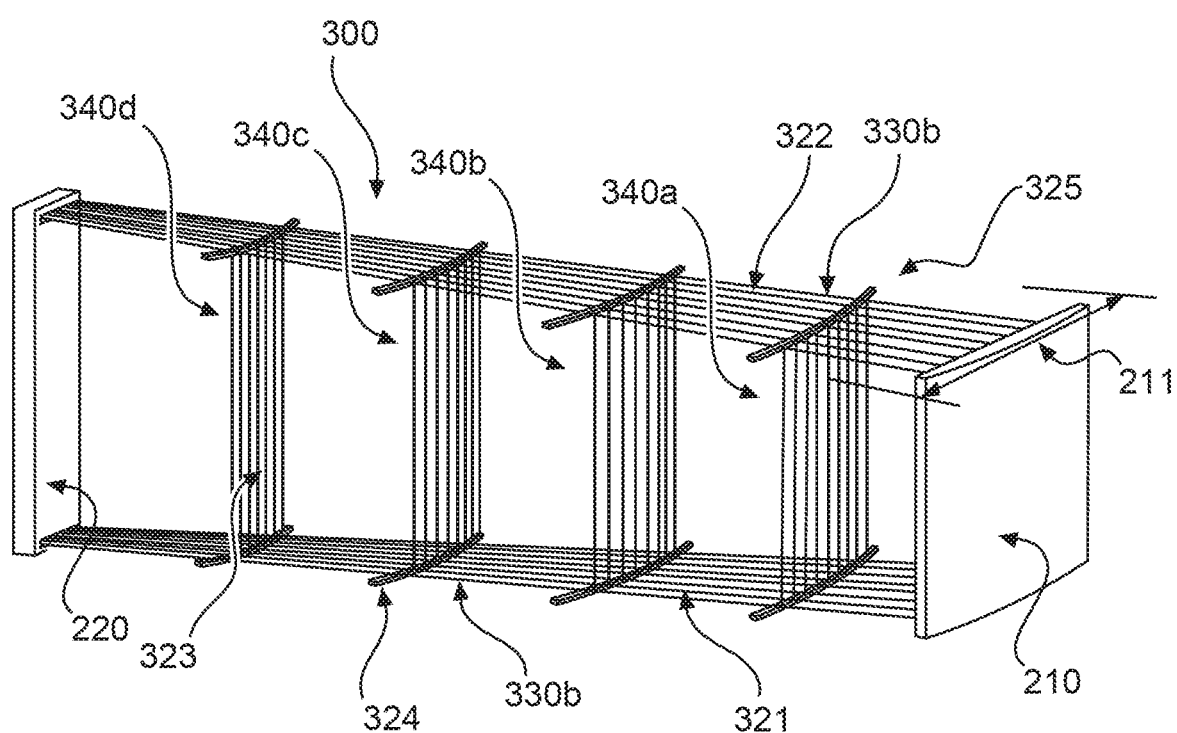
FIG. 3 a perspective view of an exemplary embodiment of a semi-finished part foundation segment for a semi-finished part.

In the example shown in FIG. 3, the inner limiting element 220 has a height which is greater than a height of the outer limiting element 210. The inner limiting element 220 may however also have a height which preferably corresponds to a height of the outer limiting element 210.

The reinforcement 230 comprises struts which extend radially between the outer limiting element 210 and the inner limiting element 220, and run towards each other starting from the outer limiting element 210 in the direction of the inner limiting element 220. The struts of the reinforcement 230 extend over a substantial region of the interior which is defined as a space between the inner edge and the outer edge. This interior can later be filled with curable casting compound in order to produce the foundation 120. Preferably, the space between the inner edge and the outer edge may be a first partial interior, and preferably a space inside the interior may be a second partial interior. Here, preferably the first partial interior and the second partial interior can later be filled with curable casting compound in order to produce the foundation.

With reference to FIG. 3, an embodiment of a semi-finished part foundation segment 300 for a semi-finished part 200 in the form of a ring segment is shown. The semi-finished part foundation segment 300 here has an outer limiting element 210 from which struts 321, 322 extend substantially in the horizontal direction up to an inner limiting element 220. Here, the inner limiting element 220 is oriented substantially parallel to the outer limiting element 210. In addition, the outer limiting element 210 has a width 211 which is greater than a width of the inner limiting element 220. With this design, the struts 321, 322 run towards each other in the direction of the inner limiting element 220. The struts 321, 322 comprise first struts 321 which extend in a first horizontal plane 330a from the outer limiting element 210 to the inner limiting element 220. In addition, in the example shown here, the struts 321, 322 also comprise second struts 322 which extend in a second horizontal plane 330b from the outer limiting element 210 to the inner limiting element 220. The first horizontal plane 330a and the second horizontal plane 330b are designed so as to be substantially horizontal, wherein the second horizontal plane 330b is spaced from the first horizontal plane 330a in the vertical direction. In this exemplary embodiment, the first struts 321 and the second struts 322 are spaced apart from each other and distributed equidistantly over the width 211 of the outer limiting element 210 and the width of the inner limiting element 220. The struts 321, 322 may preferably also be distributed load-dependently. In addition, further horizontal planes with struts may be provided.

Furthermore, according to the example shown in FIG. 3, vertical struts 323 are provided which extend substantially in the vertical direction from the first struts 321 to the second struts 322. The vertical struts 323 are arranged parallel or coaxially to the outer limiting element 210 and the inner limiting element 220 in vertical planes 340a, 340b, 340c, 340d. The vertical planes 340a, 340b, 340c, 340d may be spaced apart from each other in the horizontal direction and comprise the same number of vertical struts 323. According to the example shown in FIG. 3, the vertical planes 340a, 340b, 340c, 340d are evenly spaced apart from each other in the horizontal direction. The vertical planes 340a, 340b, 340c, 340d may however also be spaced apart from each other load-dependently, in particular more tightly and/or more widely. In addition, the vertical struts 323 are spaced apart from each other in a vertical plane 340a, 340, 340c, 340d and formed as rods.

Furthermore, according to FIG. 3, tangential struts 324, 325 are provided which extend radially in the horizontal direction and each comprise a first protruding end and a second protruding end. A protruding end is the portion of a tangential strut 324, 325 which protrudes beyond the other struts 321, 322. The tangential struts 324, 325 are here curved in arcuate form and are coaxial or parallel to the outer limiting element 210. According to this exemplary embodiment, first tangential struts 324 are arranged in the first horizontal plane 330a, and second tangential struts 325 are arranged in the second horizontal plane 330b.

The vertical struts 323 are arranged in a first vertical plane 340a, a second vertical plane 340b, a third vertical plane 340c and a fourth vertical plane 340d. Here, the first vertical plane 340a, the second vertical plane 340b, the third vertical plane 340c and the fourth vertical plane 340d are oriented parallel or coaxial to each other, and parallel or coaxial to the outer limiting element 210 and inner limiting element 220. In addition, further vertical planes with vertical struts may be provided. In particular, the number of vertical planes and hence also of vertical struts may depend on a length of the struts 321, 322 and/or be load-dependent.

According to the exemplary embodiment shown in FIG. 3, the first tangential struts 324 are connected to the first struts 321 and first ends of the vertical struts 323. Furthermore, the second tangential struts 325 are connected to the second struts 322 and the second ends of the vertical struts 323.

The semi-finished part foundation segment 300 shown here is totally free from a lower base element and an upper cover element. Accordingly, the semi-finished part foundation segment 300 is configured to be open at the top and bottom.

The semi-finished part 200 according to FIG. 2 may be produced by positioning several semi-finished part foundation segments 300 shown in FIG. 3, preferably on a prepared foundation base surface. The foundation 120 can be produced by filling the interior or first partial interior and second partial interior with curable casting compound, in particular concrete or another casting material, onto the foundation base surface from above in the direction of gravity.

Figure 4A:
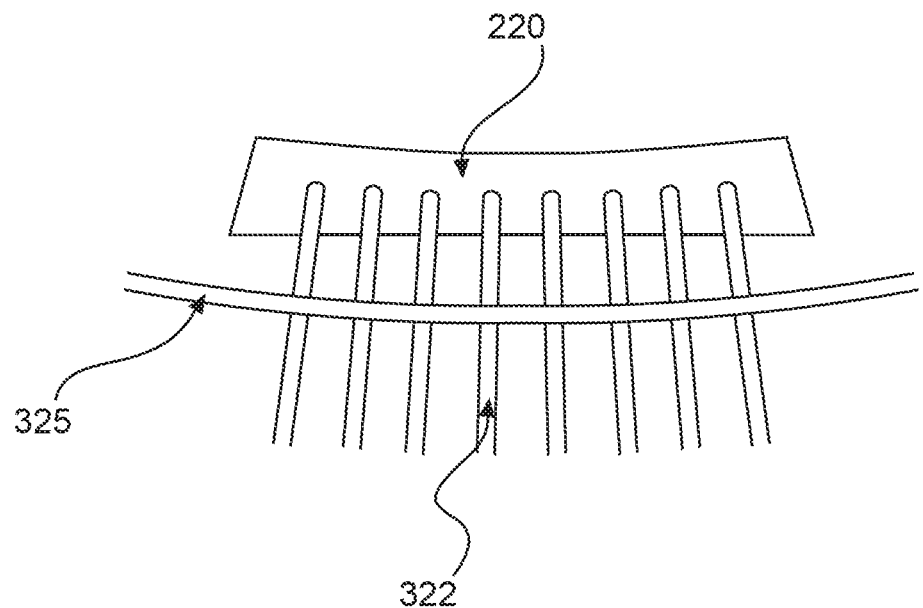
FIG. 4a a top view of an extract of a semi-finished part foundation segment according to FIG. 3.
Figure 4B:
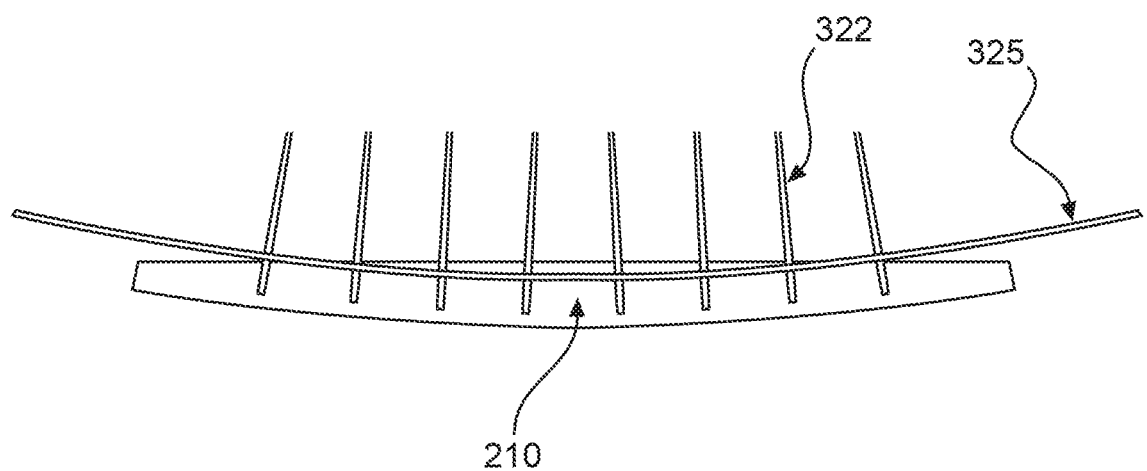
FIG. 4b a top view of an extract of a semi-finished part foundation segment according to FIG. 3.

FIGS. 4a and 4b each show an extract of a semi-finished part foundation segment according to the example shown in FIG. 3. FIG. 4a here shows an inner limiting element 220, from which struts 322 extend which are connected to a tangential strut 325.

The exemplary embodiment in FIG. 4b shows an outer limiting element 210 from which struts 322 extend. According to this embodiment, a tangential strut 325 is formed on the outer limiting element 210 and extends at least partially into the outer limiting element 210. The tangential strut 325 according to FIGS. 4a and 4b is here oriented orthogonally to the struts 322.

Figure 5A:
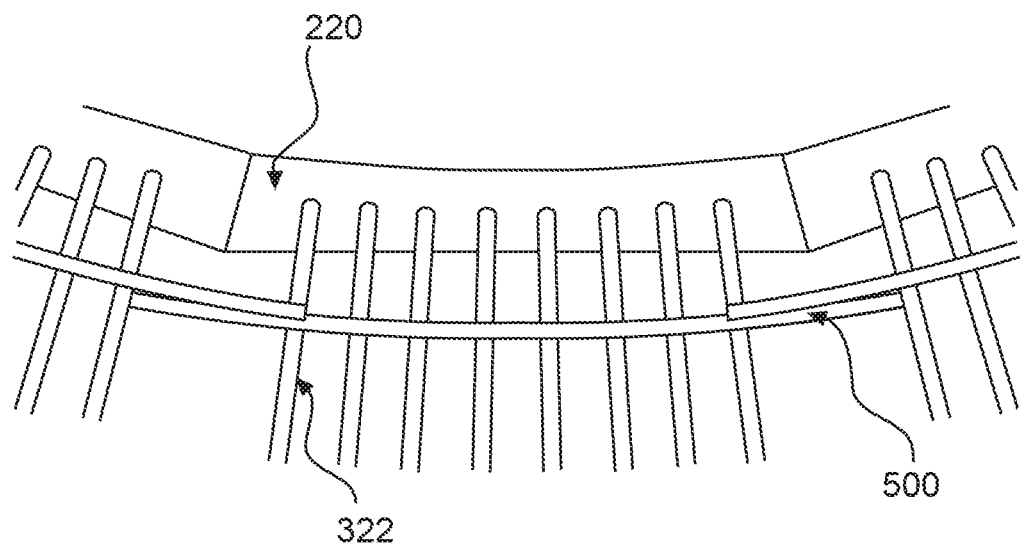
FIG. 5a a top view of an extract of a semi-finished part according to FIG. 2.
Figure 5B:
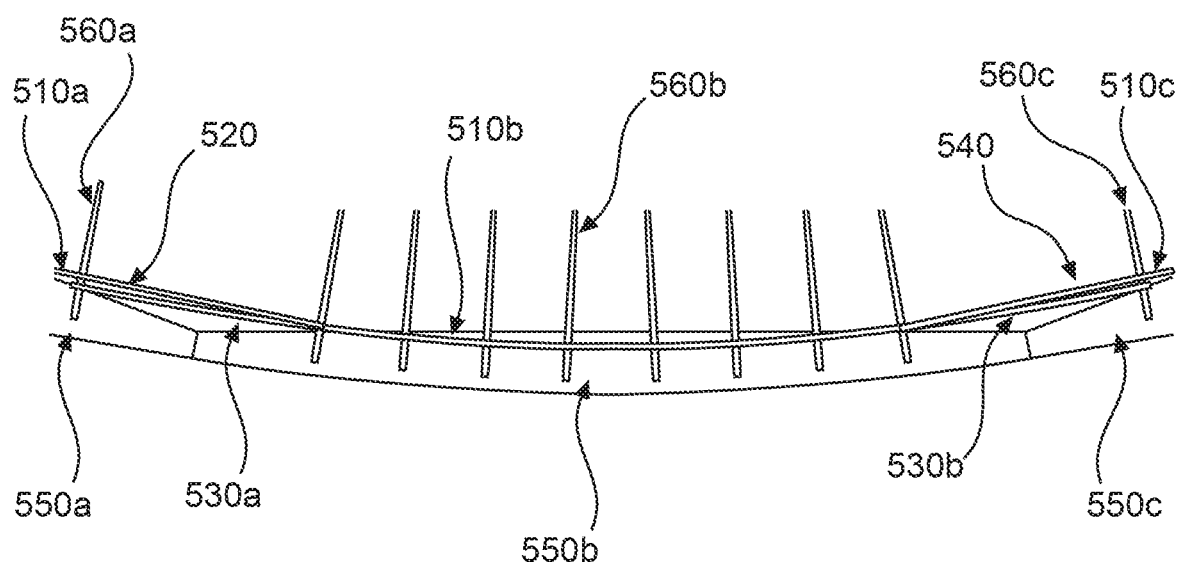
FIG. 5b a top view of an extract of a semi-finished part according to FIG. 2.

The extract from FIG. 5a shows an overlap 500 of the tangential struts which extend orthogonally to the struts 222. According to FIG. 5a, the struts 322 extend substantially horizontally from the respective inner limiting element 220 of the semi-finished part foundation segments. FIG. 5b shows extracts of three semi-finished part foundation segments 300 arranged next to each other so that the respective protruding ends of the tangential struts 510a, 510b, 510c overlap. The extract shown here as an example has a first outer limiting element 550a with struts 560a, and a first tangential strut 510a with a second protruding end 520. This second protruding end 520 of the first tangential strut 510a overlaps with a first protruding end 530a of a second tangential strut 510b which extends orthogonally to struts 560b of a second outer limiting element 550b. The second tangential strut 510b furthermore has a second protruding end 530b which overlaps with a first protruding end 540 of a third tangential strut 510c. The third tangential strut 510c here extends orthogonally to struts 560c of a third outer limiting element 550c.

The semi-finished parts and/or the semi-finished part foundation segments have various advantages. In particular, foundations can be produced thereby easily and/or cheaply. Furthermore, the time for constructing a foundation and/or a structure can be significantly reduced. In particular, with such foundations, an even force flow and/or secure transfer of forces occurring can be provided.

REFERENCE SIGNS

100 Wind turbine
102 Tower
104 Nacelle
106 Aerodynamic rotor
108 Rotor blades
110 Spinner
120 Foundation
200 Semi-finished part
210 Outer limiting element
211 Width of outer limiting element
220 Inner limiting element
230 Reinforcement
300 Semi-finished part foundation segment
321, 322 Struts/horizontal struts
323 Vertical struts
324, 325 Tangential struts
330a First horizontal plane
330b Second horizontal plane
340a First vertical plane
340b Second vertical plane
340c Third vertical plane
340d Fourth vertical plane
500 Overlap
510a First tangential strut
510b Second tangential strut
510c Third tangential strut
520 Second protruding end of first tangential strut
530a First protruding end of second tangential strut
530b Second protruding end of second tangential strut
540 First protruding end of third tangential strut
550a First outer limiting element
550b Second outer limiting element
550c Third outer limiting element
560a First struts/horizontal struts
560b Second struts/horizontal struts
560c Third struts/horizontal struts

The invention claimed is:
1. A wind turbine, comprising:
a round foundation; and
a tower located on the round foundation,
wherein the round foundation includes a plurality of radial-shaped foundation segments, each comprising:
an outer limiting element; and
a reinforcement connected to the outer limiting element and comprising a plurality of struts protruding from the outer limiting element, the reinforcement including a plurality of through openings formed by the plurality of struts, wherein the outer limiting elements of the plurality of radial-shaped foundation segments form an outer edge of the round foundation and delimit an interior comprising the plurality of the through openings, wherein the reinforcements of the plurality of radial-shaped foundation segments extend from the outer edge into the interior, and wherein the plurality of through openings extend to a prepared foundation base surface such that curable casting compound fills the plurality of through openings of the plurality of radial-shaped foundation segments and extends to the prepared foundation base surface.

2. The wind turbine as claimed in claim 1, wherein the round foundation is annular.

3. The wind turbine as claimed in claim 1, wherein the plurality of radial-shaped foundation segments are substantially identical and are shaped as partial ring or circle segments.

4. The wind turbine as claimed in claim 1, comprising an inner limiting element connected to the reinforcement, wherein the inner limiting elements of the plurality of radial-shaped foundation segments form an inner edge.

5. The wind turbine as claimed in claim 1, wherein portions of reinforcements of adjacent ones of the plurality of radial-shaped foundation segments overlap.

6. The wind turbine as claimed in claim 1, wherein the reinforcement of at least one of the plurality of radial-shaped foundation segments comprises reinforcing elements.

7. The wind turbine as claimed in claim 1, wherein at least one of the plurality of radial-shaped foundation segments comprises at least one functional element.

8. The wind turbine as claimed in claim 1, wherein the tower is a wind turbine tower.

9. A wind turbine, comprising:
a wind turbine tower; and
a round foundation supporting the wind turbine tower, wherein the round foundation comprises a plurality of radial-shaped foundation segments, each radial-shaped foundation segment comprising:
an outer limiting element; and
a reinforcement connected to the outer limiting element and comprising a plurality of struts protruding from the outer limiting element, the reinforcement including a plurality of openings formed by the plurality of struts, wherein the outer limiting element is configured so as to form a part of an outer edge of the round foundation and delimit an interior comprising the plurality of openings, wherein the plurality of openings are filled with a curable casting compound, wherein the reinforcement extends from the outer edge into the interior, wherein the plurality of openings of the plurality of radial-shaped foundation segments extend to a prepared foundation base surface and the curable casting compound extends through the plurality of openings of the plurality of radial-shaped foundation segments to the prepared foundation base surface.

10. The wind turbine as claimed in claim 9, comprising a support unit which is connected to the plurality of struts and arranged substantially coaxially to the outer limiting element.

11. A method of making a foundation, comprising:
preparing a foundation base surface;
producing a plurality of radial-shaped foundation segments, wherein each of the plurality of radial-shaped foundation segments comprise:
an outer limiting element; and
a reinforcement connected to the outer limiting element and comprising a plurality of struts protruding from the outer limiting element, the reinforcement including a plurality of openings formed by the plurality of struts, wherein the outer limiting elements of the plurality of radial-shaped foundation segments form an outer edge which delimits an interior comprising the plurality of openings, wherein the reinforcements of the plurality of radial-shaped foundation segments extend from the outer edge into the interior;

arranging the plurality of radial-shaped foundation segments on the foundation base surface to form a round foundation, wherein the plurality of openings of radial-shaped foundation segments extend to the foundation base surface;

filling the interior with curable casting compound such that the curable casting compound extends to the foundation base surface; and curing the curable casting compound.

12. The method as claimed in claim 11, further comprising:
building a wind turbine tower on the round foundation.

* * * * *